United States Patent [19]

Peng

[11] Patent Number: 5,315,783
[45] Date of Patent: May 31, 1994

[54] FLOWERPOT WITH WATER/SOIL SEPARATIVE PLANTING SYSTEM

[76] Inventor: Luke S. Peng, No. 8-4, Sec. 1, Tai-Shing W. Rd., Tao-Yuan, Taiwan

[21] Appl. No.: 921,552

[22] Filed: Jul. 29, 1992

[51] Int. Cl.$^5$ .............................................. A01G 25/00
[52] U.S. Cl. .......................................... 47/66; 47/79; 47/84; 47/25
[58] Field of Search ............... 47/79, 81, 66, 66 D, 47/67, 84, 84 C, 25 R

[56] References Cited

U.S. PATENT DOCUMENTS

| | | | |
|---|---|---|---|
| 2,822,644 | 2/1958 | Berger | 47/25 R |
| 3,314,194 | 4/1967 | Halleck | 47/69 |
| 4,712,329 | 12/1987 | Anderson | 47/84 C |
| 4,962,613 | 10/1990 | Nalbandian | 47/79 |
| 5,042,197 | 8/1991 | Pope | 47/79 |

FOREIGN PATENT DOCUMENTS

| | | | |
|---|---|---|---|
| 160979 | 7/1933 | Switzerland | 47/79 |
| 1036298 | 8/1983 | U.S.S.R. | 47/25 R |
| 1537181 | 1/1990 | U.S.S.R. | 47/69 |
| 2200523 | 8/1988 | United Kingdom | 47/79 I |

Primary Examiner—Henry E. Raduazo
Attorney, Agent, or Firm—Hidaka and Benman

[57] ABSTRACT

A flowerpot employs a water reservoir in its bottom section, a soil holding section above the water reservoir, a porous water/soil separation board which separates the water reservoir and the soil holding section, and a pot cover. Any excessive water in the water reservoir can escape to the outside through an overflow water escape facility. The porous water/soil separation board holds the soil thereon and allows any moisture or water to pass therethrough. The pot cover collects dews and rainwater and keeps the moisture in the pot from escaping to the outside by evaporation. Namely, the flowerpot is a planting system which has automatic water preserving, drainage, and recycling facilities.

3 Claims, 4 Drawing Sheets

FLOWERPOT WITH WATER/SOIL SEPARATIVE PLANTING SYSTEM

BACKGROUND OF THE INVENTION

1. Field of The Invention

The present invention relates generally to a water/soil separative planting system, and particularly to a flowerpot which has automatic water preserving, drainage, and recycling facilities.

2. Description of The Prior Art

People living in urban areas often keep flowers, shrubs, trees, and other plants in flowerpots and place the pots on terraces, balconies or decks. Such plants not only provide good air quality but also beautify the places. However, since a conventional flowerpot includes neither self water storage facility nor automatic water drainage facility, the plant in the pot is frequently subjected to a water problem, either an excessive water or a shortage of water. In other words, the root of the plant will soon be rotten if it is soaked in the water for a substantial time period because of a continuous rainfall or an excessive watering. The plant will naturally wither if it is not watered enough and no rain falls.

SUMMARY OF THE INVENTION

The primary object of the present invention is to provide a flowerpot with a water/soil separative planting system which consists of self water storage and drainage facilities to constantly maintain an adequate amount of moisture for the plant in the pot so that rotting or withering of the plant may be avoided.

In order to achieve the above object, the flowerpot according to the present invention employs a water reservoir in its bottom section, a soil holding section above the water reservoir, a porous water/soil separation board which separates the water reservoir and the soil holding section, and a pot cover. Any excessive water in the water reservoir can escape to the outside through an overflow water escape facility. The porous water/soil separation board holds soil thereon and allows any moisture or water to pass therethrough. The pot cover collects dews and rainwater and keeps the moisture in the pot from escaping to the outside by evaporation. Thus, the flowerpot constitutes a planting system which not only provides adequate moisture to the soil automatically, thereby maintaining a suitable environment for the plant, but also preserves the water by recycling the water within the pot.

The present invention can be more fully understood by referring to the detailed description below and accompanying drawings which form an integral part of this application.

DETAILED DESCRIPTION OF THE PREFERRED EMBODIMENTS

Figure 1C:
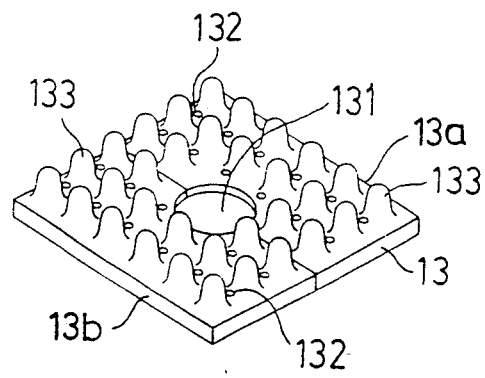
FIGS. 1A, 1B and 1C are perspective views of a flowerpot and its components according to the first preferred embodiment of the present invention.
Figure 1B:
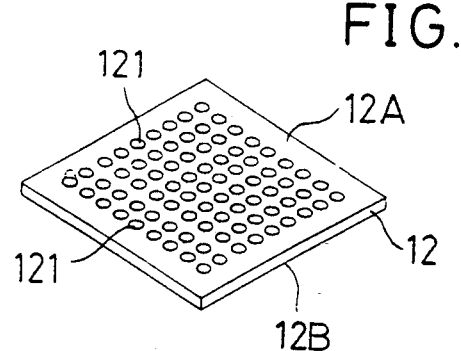
Figure 1A:
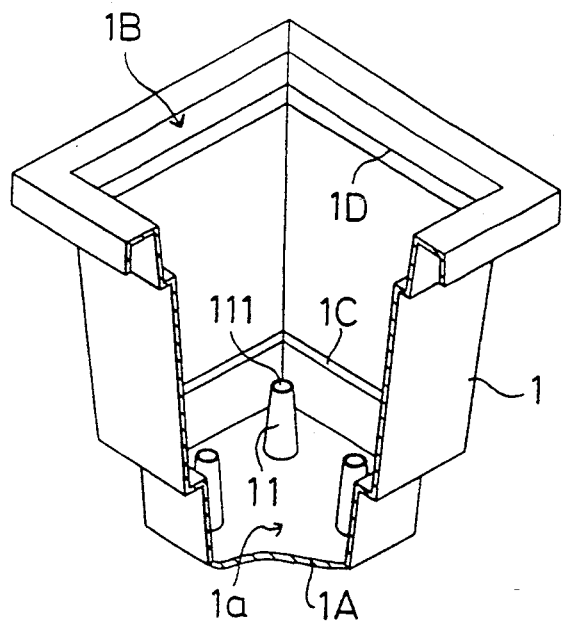
Figure 4:
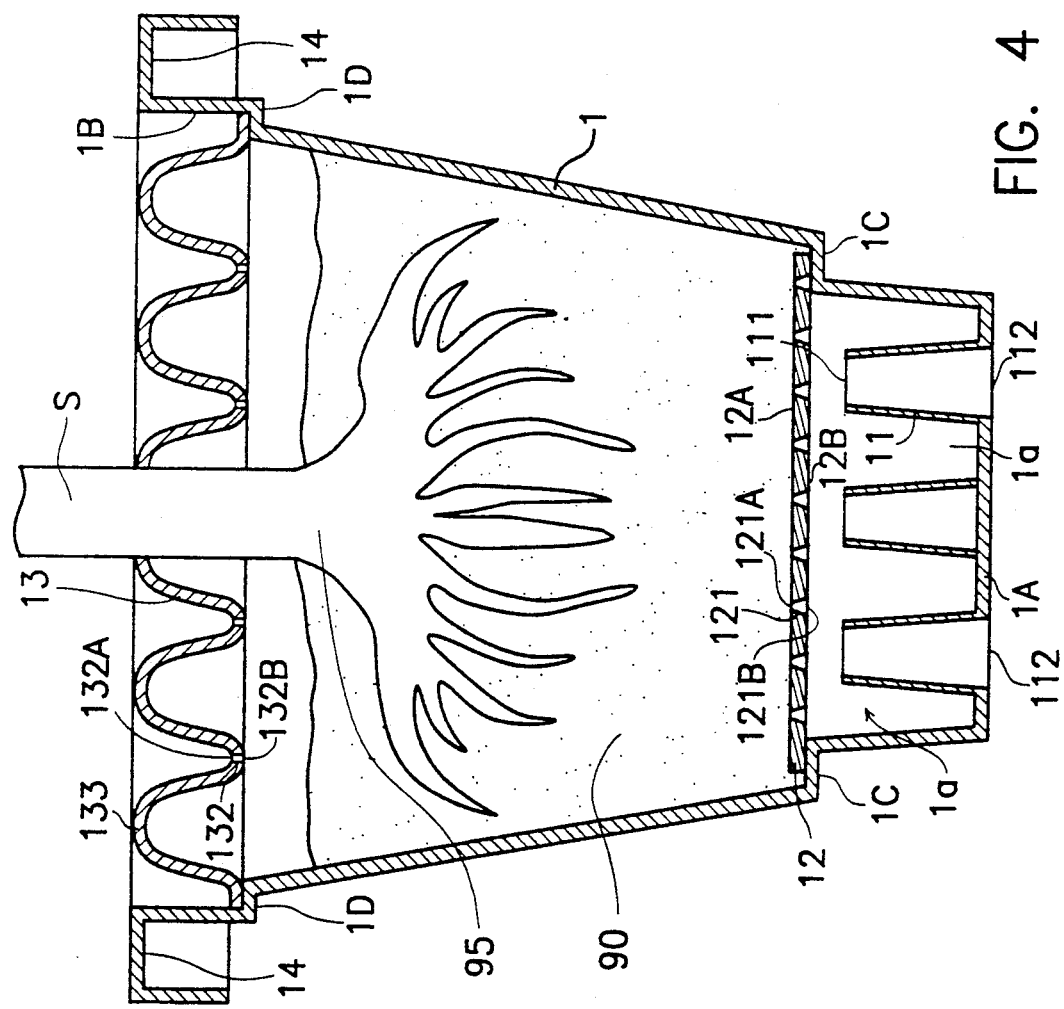
FIG. 4 is a cross-sectional view of the flowerpot, in its functional state, shown in FIGS. 1A to 1C.

FIGS. 1A, 1B and 1C show a flowerpot and its components according to the first preferred embodiment of the present invention. FIG. 4 cross-sectionally shows the same flowerpot, in its functional state. A flowerpot with a water/soil separative planting system includes a pot body 1, as shown in FIGS. 1A and 4, a porous water/soil separation board 12, as shown in FIGS. 1B and 4, and a pot cover 13, as shown in FIGS. 1C and 4. The pot body 1 has a bottom 1A, a top opening 1B, and a singular or plurality of overflow water escape tubes 11 which upwardly extend from the bottom 1A. Each of the overflow water escape tubes 11 has a water inlet hole 111 and a bottom opening 112 at the top end and the bottom end, respectively, thereof and all of the water inlet holes 111 are situated horizontally aligned at an even level. The bottom section of the pot body 1, from the bottom 1A to the level of the water inlet holes 111 of the overflow water escape tubes 11, forms a water reservoir 1a. Any excessive water in the reservoir 1a will automatically flow into the overflow water escape tubes 11 through the water inlet holes 111 and exit to the outside of the pot body 1 through the bottom openings 112, if and after the water level has reached the water inlet holes 111. The overflow water escape tubes 11 in this embodiment are frustum-shaped hollow posts, as shown in FIG. 4, such that the diameter of the water inlet holes 111 is smaller than the diameter of the bottom openings 112.

The pot body 1 is also provided with a first shoulder 1C and a second shoulder 1D so that the water/soil separation board 12 and the pot cover 13, respectively, rest thereon horizontally as shown in FIG. 4. The second shoulder 1D and the pot cover 13 are disposed near the top opening 1B. The water/soil separation board 12 is disposed slightly above the water inlet holes 111 of the overflow water escape tubes 11 so that the water in the reservoir 1a may not directly touch the board 12. The pot body 1, in its functional state, will accommodate soil 90 on the water/soil separation board 12 as shown in FIG. 4. Namely, the pot body 1 has a soil holding section above the water reservoir 1a and between the first shoulder 1C and the second shoulder 1D, and the water/soil separation board 12, holding the soil 90 thereon, constitutes the bottom of the soil holding section.

Referring to FIGS. 1B and 4, the water/soil separation board 12 has a top surface 12A and a bottom surface 12B and is provided with a plurality of through-holes 121 between the top and the bottom surfaces 12A, 12B. Each of the through-holes 121 has a top opening 121A and a bottom opening 121B at the top surface 12A and the bottom surface 12B, respectively. The diameter of the top opening 121A is made smaller than the diameter of the bottom opening 121B. The purpose of such design is to prevent the soil 90 placed on the water/soil separation board 12 from dropping into the reservoir 1a through the through-holes 121.

Referring to FIGS. 1C and 4, the pot cover 13 has a stem opening 131 which allows the stem S of a plant 95 planted in the pot body 1 to extend therethrough as shown in FIG. 4. The pot cover 13 consists of a pair of cover members 13a, 13b as shown in FIG. 1C. Such multi-piece design of the pot cover 13 particularly facilitates removal or replacement of the pot cover 13 after the plant 95 has grown through the stem opening 131.

The stem opening 131 is formed by combining a semicircular cutaway made on the inside edge of each of the cover members 13a, 13b. The pot cover 13 also has a plurality of arcuate protrusions 133. The lowest points of the pot cover 13 are located between the protrusions 133 and a plurality of small water dropping holes 132 are provided at the lowest points of the pot cover 13 between the arcuate protrusions 133. The purpose of this design is to collect rain water and dews effectively and allows them to drop into the pot body 1 and onto the soil 90 through the water dropping holes 132. Any excessive water having dropped to the soil 90 will pass through the soil 90 and the through-holes 121 of the water/soil separation board 12 and will then be stored in the reservoir 1a. Most of the water evaporating from the soil will be condensed on the inside surfaces of the arcuate protrusions 133 and will then drip back onto the soil 90. Thus, the moisture in the pot body 1 is not only kept from uselessly escaping to the outside but also automatically recycled so as to keep the soil 90 adequately moistened. The soil 90 will be kept from becoming excessively dry even if the caretaker does not water the pot, or no rain falls, for a substantial period of time, because the moisture also comes up from the water in the reservoir 1a through the through-holes 121 of the water/soil separation board 12.

Figure 2C:
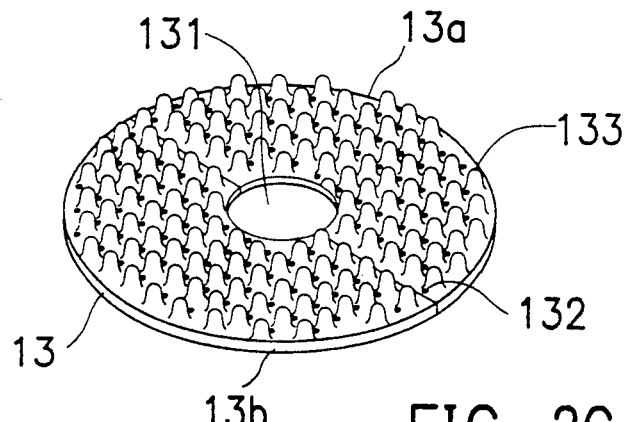
FIGS. 2A, 2B and 2C are perspective views of a flowerpot and its components according to the second preferred embodiment of the present invention.
Figure 2B:
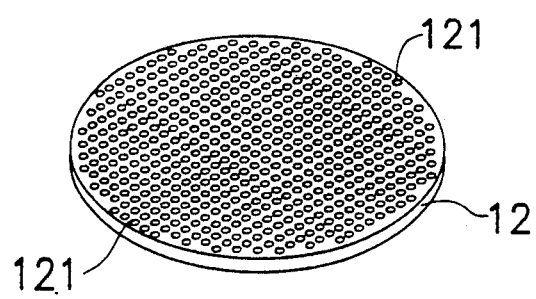
Figure 2A:
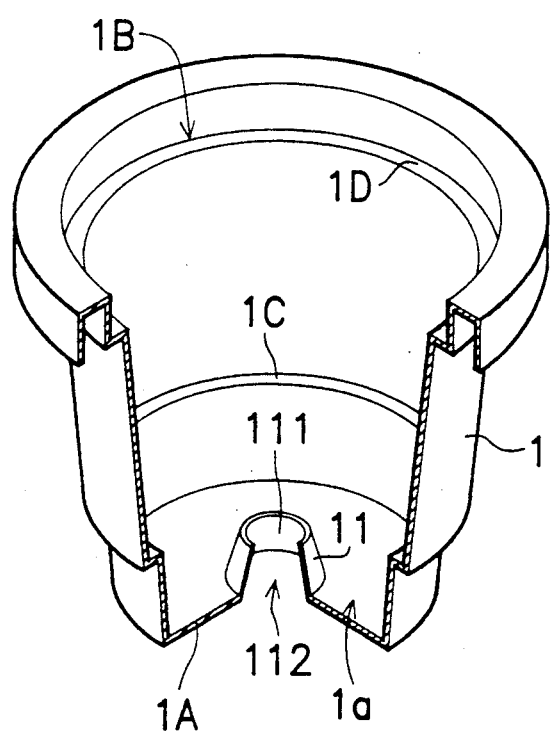
Figure 3C:
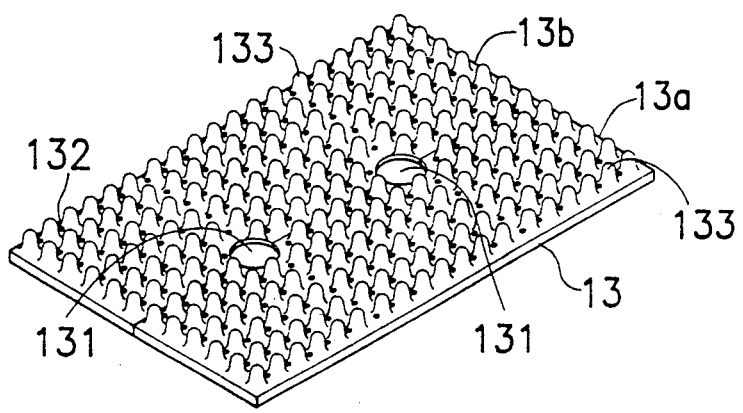
FIGS. 3A, 3B and 3C are perspective views of a flowerpot and its components according to the third preferred embodiment of the present invention.
Figure 3B:
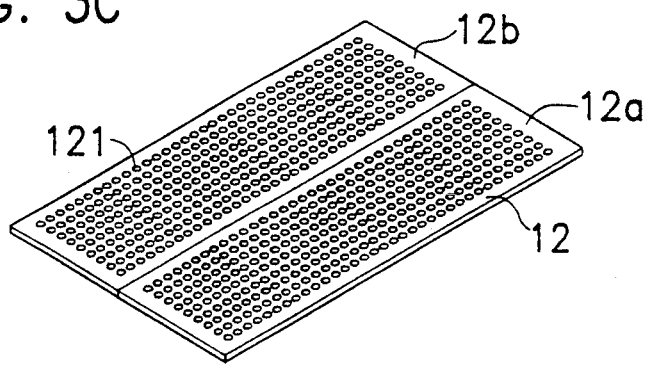
Figure 3A:
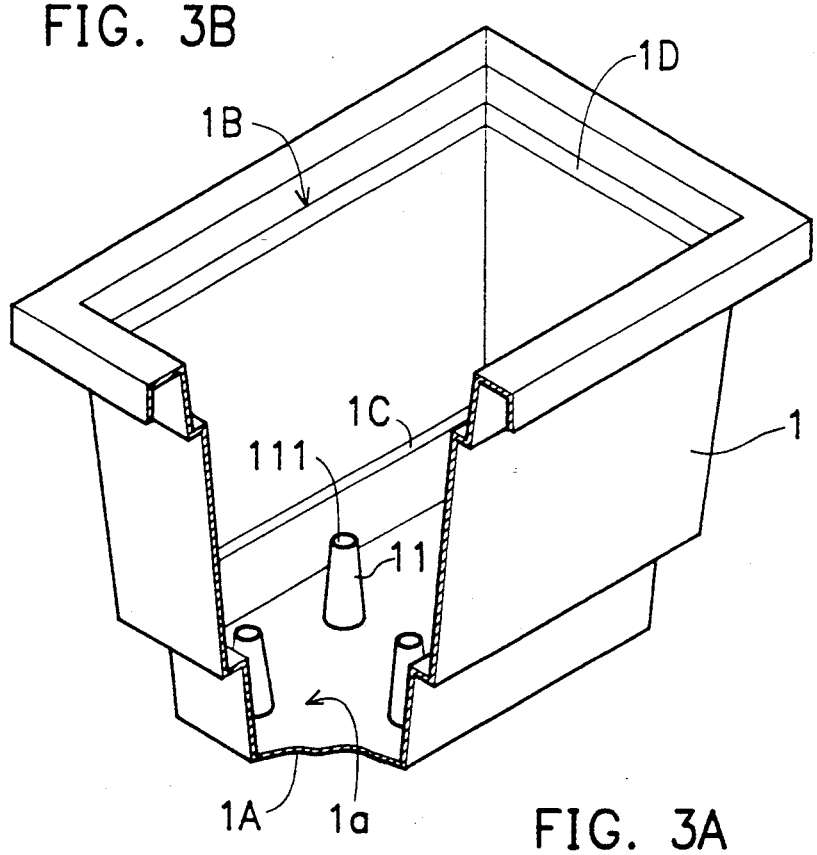

FIGS. 2A, 2B and 2C show a flowerpot and its components according to the second preferred embodiment of the present invention. FIGS. 3A, 3B and 3C show a flowerpot and its components according to the third preferred embodiment of the present invention. The like reference numerals among FIG. 1A to 1C, FIGS. 2A to 2C, FIGS. 3A to 3C, and FIG. 4 represent like components. The basic structure of the flowerpot of the second embodiment is the same as that of the first embodiment except for its circular shape as opposed to the square shape of the first embodiment. The basic structure of the flowerpot of the third embodiment is also basically the same as that of the first embodiment, except for its rectangular shape and the designs of the water/soil separation board 12 and the pot cover 13. The water/soil separation board 12 of the third embodiment consists of a pair of boards 12a, 12b as shown in FIG. 3B. The pot cover 13 of the third embodiment, as shown in FIG. 3C, has two circular stem openings 131 which are formed by combining a pair of semicircular cutaways made on the inside edge of each of the cover members 13a, 13b. Naturally, the shape of the pot body 1, the water/soil separation board 12, and the pot cover 13 may be made in any other polygonal or practicable shape and any number of the stem opening 131 may be made to meet user's requirements.

Referring to FIG. 4, the outer rim of the pot body 1 is provided with a groove 14 for accepting hanger hooks. The pot cover 13 may be made of a transparent material so that the plant 95 in the pot may receive sufficient sunlight for better photosynthesis effect. The pot body 1 and the water/soil separation board 12 may also be made of transparent materials so that inside of the pot body 1 and the the plant 95 can be better observed and/or photographically recorded for educational or experimental purposes.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A flowerpot, comprising:
   (a) a pot body having an open top, a bottom, and a water reservoir, said water reservoir having an overflow water escape facility, having a water inlet hole at the top of said water reservoir, for allowing any excessive water in said water reservoir to escape therethrough;
   (b) a soil holding section above said water inlet hole of said water reservoir;
   (c) a water/soil separation board, which constitutes the bottom of said soil holding section, disposed above said water inlet hole, said water/soil separation board being capable of holding soil thereon but capable of passing water or moisture therethrough; and
   (d) a pot cover disposed in the proximity of said open top, said pot cover having a step opening for allowing a stem of a plant to extend therethrough, said pot cover being capable of passing water or moisture therethrough, said pot cover further having a plurality of arcuate protrusions, the lowest points of said pot cover being located between said protrusions, and a plurality of water dropping holes at the lowest points for dropping therethrough any water accumulated on said pot cover into said pot body.

2. A flowerpot, comprising:
   (a) a pot body having an open top, a bottom, and a water reservoir, said water reservoir having an overflow water escape facility, having a water inlet hole at the top of said water reservoir, for allowing any excessive water in said water reservoir to escape therethrough;
   (b) a soil holding section above said water inlet hole of said water reservoir;
   (c) a water/soil separation board, which constitutes the bottom of said soil holding section, disposed above said water inlet hole, said water/soil separation board being capable of holding soil thereon but capable of passing water or moisture therethrough; and
   (d) a pot cover disposed in the proximity of said open top, said pot cover having a stem opening for allowing a stem of a plant to extend therethrough, said pot cover being capable of passing water or moisture therethrough, said pot cover further having a plurality of arcuate protrusions, the lowest points of said pot cover being located between said protrusions, and a plurality of water dropping holes at the lowest points for dropping therethrough any water accumulated on said pot cover into said pot body;
   wherein said pot body has a first shoulder for accepting said water/soil separation board thereon and a second shoulder in the proximity of said open top for accepting said pot cover thereon.

3. A flowerpot, comprising:
   (a) a pot body having an open top, a bottom, and a water reservoir, said water reservoir having an overflow water escape facility, having a water inlet hole at the top of said water reservoir, for allowing any excessive water in said water reservoir to escape therethrough;

(b) a soil holding section above said water inlet hole of said water reservoir;
(c) a water/soil separation board, which constitutes the bottom of said soil holding section, disposed above said water inlet hole, said water/soil separation board being capable of holding soil thereon but capable of passing water or moisture therethrough; and
(d) a pot cover disposed in the proximity of said open top, said pot cover having a stem opening for allowing a stem of a plant to extend therethrough, said pot cover being capable of passing water or moisture therethrough, said pot cover further having a plurality of arcuate protrusions, the lowest points of said pot cover being located between said protrusions, and a plurality of water dropping holes at the lowest points for dropping therethrough any water accumulated on said pot cover into said pot body, said pot cover being made of a transparent material so that the plant in said pot body may receive sufficient sunlight for photosynthesis.

* * * * *